(12) United States Patent
Kotecha et al.

(10) Patent No.: US 11,736,623 B2
(45) Date of Patent: Aug. 22, 2023

(54) SYSTEMS AND METHODS FOR GRANULAR CHARGING IN MOBILE WIRELESS NETWORKS

(71) Applicant: Verizon Patent and Licensing Inc., Basking Ridge, NJ (US)

(72) Inventors: Lalit R. Kotecha, San Ramon, CA (US); Suzann Hua, Beverly Hills, CA (US); Patricia R. Chang, San Ramon, CA (US); Jin Yang, Orinda, CA (US); Donna L. Polehn, Mercer Island, WA (US); Vishwanath Ramamurthi, San Ramon, CA (US); Arda Aksu, Lafayette, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 93 days.

(21) Appl. No.: 17/230,299

(22) Filed: Apr. 14, 2021

(65) Prior Publication Data

US 2022/0337706 A1  Oct. 20, 2022

(51) Int. Cl.
*H04M 15/00* (2006.01)
*H04W 4/24* (2018.01)

(52) U.S. Cl.
CPC .......... *H04M 15/66* (2013.01); *H04M 15/60* (2013.01); *H04M 15/61* (2013.01); *H04M 15/67* (2013.01); *H04W 4/24* (2013.01)

(58) Field of Classification Search
CPC ...... H04M 15/66; H04M 15/60; H04M 15/61; H04M 15/67; H04W 4/24
USPC .......................................................... 455/406
See application file for complete search history.

(56) References Cited

U.S. PATENT DOCUMENTS

2017/0359749 A1* 12/2017 Dao .................... H04L 47/2416
2020/0092423 A1*  3/2020 Qiao ....................... H04W 8/08

* cited by examiner

*Primary Examiner* — Huy C Ho

(57) ABSTRACT

A charging function device may include a processor configured to obtain subscription information associated with a user equipment (UE) device in a wireless communication network. The processor may be further configured to receive, from a gateway device, data flow information relating to data flows associated with the UE device; receive, from a policy device, policy information relating to policies applied to the data flows associated with the UE device; generate a record for the UE device based on the received data flow information and the received policy information, wherein the record identifies at least one account charge based on a particular data flow associated with the UE device; and provide the generated charging record to an account system.

20 Claims, 8 Drawing Sheets

SYSTEMS AND METHODS FOR GRANULAR CHARGING IN MOBILE WIRELESS NETWORKS

BACKGROUND INFORMATION

To satisfy the needs and demands of users of mobile communication devices, providers of wireless communication services continue to improve and expand available services and networks used to deliver such services. One aspect of such improvements includes the development of wireless access networks and options to utilize such wireless access networks. A wireless access network may manage a large number of user devices. The user devices may request different types of services. Managing all the various types of services, user devices, and enterprises poses various challenges.

DETAILED DESCRIPTION OF PREFERRED EMBODIMENTS

Figure 1:
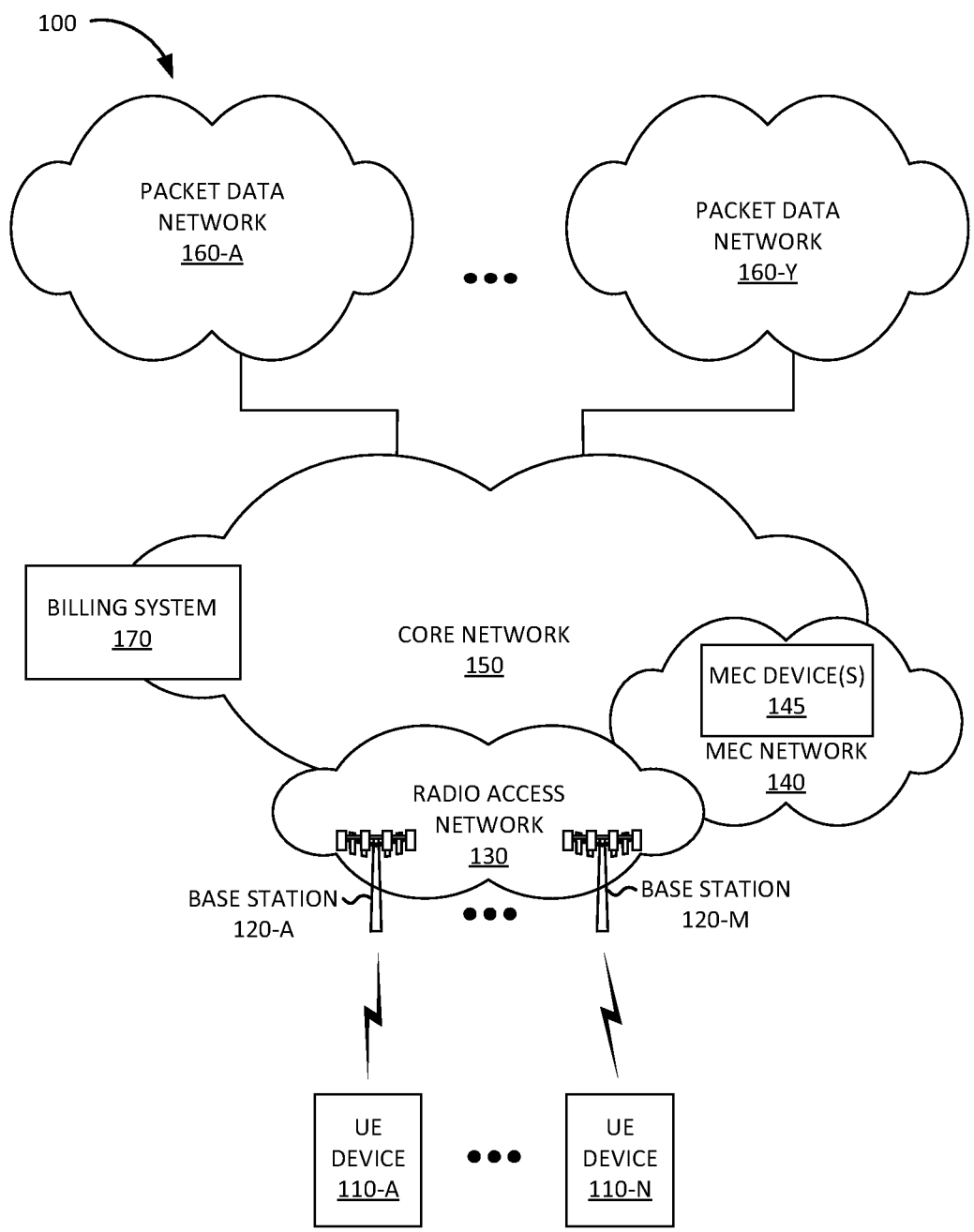
FIG. 1 illustrates an environment according to an implementation described herein.

The following detailed description refers to the accompanying drawings. The same reference numbers in different drawings identify the same or similar elements.

Users of mobile wireless communication services may use various wireless technologies to connect to a network and/or communicate with other users. For example, a user equipment (UE) device may be configured to communicate with a Radio Access Network (RAN) via a base station using cellular wireless signals based on the Fourth Generation (4G) Long Term Evolution (LTE) air interface, the Fifth Generation (5G) New Radio (NR) air interface, and/or another type of air interface.

A UE device may be associated with a subscription to a set of services at rates which the user is charged to the account associated with the subscription for using the services. A service level agreement (SLA) may specify or guarantee a particular level of service and/or may specify a spending limit for the service. For example, a subscription may guarantee a particular throughput (e.g., a bit rate, etc.) during a time period (e.g., one billing cycle) until a specified amount of data is received by a UE device associated with the subscription via a wireless connection. A core network associated with a RAN may generate charges for the account associated with the subscription based on the services received by the UE device during a time period and a billing system may generate an accounting for the account based on the generated charges.

As the number of available services in a wireless mobile network increases, an architecture based on more granular charging may be needed in order to provide a better user experience and improve the efficiency of the wireless mobile network. For example, a 5G core network may implement network slicing. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources, may be configured to implement a different set of requirements and/or priorities, and/or may be associated with a particular Quality of Service (QoS) class, a type of service, and/or a particular enterprise customer associated with a set of UE devices. The 5G core network may need to be able to generate charges for usage of different network slices.

Implementations described herein relate to systems and methods for granular tracking and charging in mobile wireless networks. Granular charging may refer to charges that are more specific than charges based on generic data usage limits for a subscription. Thus, a core network configured for granular charging may be able to track and generate charges for usage of particular data flows.

For example, a charging function device in a core network may be configured to obtain subscription information for a UE device connected to the core network via a RAN. The charging function may receive from a gateway device, data flow information relating to data flows associated with the UE device. The charging function may receive, from a policy device, policy information relating to policies applied to those data flows associated with the UE device by the policy device and generate a charging record for the UE device based on the received data flow information and the received policy information. The charging record may include a record pertaining to account charges based on particular data flows associated with the UE device. The charging function device may also then provide the generated charging record to an account system, such as a billing system.

The gateway device may be configured to report parameters of a data flow that are used for determining charges for the data flow such as, for example, the network slice, QoS class, and/or application identifier associated with the data flow. Furthermore, the gateway device may be configured to measure and report performance parameters such as, for example, data throughput, data rate, latency, jitter, etc. Furthermore, the policy device may be configured to report policies applied to a data flow. In some implementations, the core network may include a 5G core network, the charging function device may include a Charging Function (CHF), the policy device may include a Policy Control Function (PCF), and the gateway device may include a User Plane Function (UPF). In other implementations, the core network may include a 4G core network, the charging function device may include an Online Charging System (OCS), the policy device may include a Policy and Charging Rules Function (PCRF), and the gateway device may include a Packet Data Network Gateway (PGW).

The data flow information may include QoS class information for a data flow associated with the UE device, a network slice identifier for the data flow associated with the UE device, an application identifier for the data flow associated with the UE device, a number of bytes transmitted during the data flow, a bit rate for the data flow, a latency for the data flow, and/or a packet delay variation (or another measure of jitter) for the data flow.

As an example, generating the charging record for the UE device may include generating a charge based on the QoS class for the data flow associated with the UE device. As another example, generating the charging record for the UE device may include generating a charge based on the network slice identifier for the data flow. As yet another example, generating the charging record may include generating a charge based on the application identifier for the data flow.

The policy information may include a service level assurance policy applied to a data flow associated with the UE device, a spending limit policy applied to the data flow, a security policy applied to the data flow, and/or another type of policy applied to the data flow.

Furthermore, the charging function device may be configured to generate charges for a UE device based on a termination point associated with a data flow. For example, a first charge amount may be applied for a termination point to a network outside of a provider's core network and a second charge may be applied for a termination point inside a provider's core network. In particular, the charging function device may be configured to generate charges for a UE device based on Multi-Access Edge Computing (MEC) services consumed by the UE device in a MEC network associated with a core network or the RAN controlled by the core network.

For example, the charging function device may be configured to receive, from a MEC device, MEC information relating to a MEC service consumed by the UE device, generate a charging record, for the UE device that includes a charge based on the MEC service, and provide the generated charging record to the billing system. The MEC information may include, for example, information identifying a microservice used by the UE device, computational resources associated with the MEC device, consumed by the UE device, and/or other types of MEC information.

FIG. 1 is a diagram of an exemplary environment 100 in which the systems and/or methods described herein may be implemented. As shown in FIG. 1, environment 100 may include UE devices 110-A to 110-N (referred to herein collectively as "UE devices 110" and individually as "UE device 110"), base stations 120-A to 120-M (referred to herein collectively as "base stations 120" and individually as "base station 120") in RAN 130, MEC network 140 (which includes MEC device(s) 145), core network 150, packet data networks (PDNs) 160-A to 160-Y (referred to herein collectively as "PDNs 160" and individually as "PDN 160"), and a billing system 170.

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), and/or other types of applications.

In some implementations, UE device 110 may communicate using machine-to-machine (M2M) communication, such as Machine Type Communication (MTC), and/or another type of M2M communication for IoT applications. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, an automated teller machine, a vending machine, a parking meter, etc.), and/or another type of electronic device.

RAN 130 may include base stations 120. Base station 120 may include a 5G NR base station (e.g., a gNodeB) and/or a 4G LTE base station (e.g., an eNodeB). Each base station 120 may include devices and/or components configured to enable cellular wireless communication with UE devices 110. For example, base station 120 may include a radio frequency (RF) transceiver configured to communicate with UE devices 110 using a 5G NR air interface using a 5G NR protocol stack, a 4G LTE air interface using a 4G LTE protocol stack, and/or using another type of cellular air interface. Base station 120 may enable UE device 110 to communicate with core network 150. Furthermore, base station 120 may establish an encrypted wireless communication channel with UE device 110 using session keys generated as part of the authentication process. Base stations 120 may facilitate handovers in RAN 130. For example, UE device 110 may move from a service area of a first base station 120 to the service area of a second base station 120 and a connection may be handed over from the first base station 120 to the second base station 120 in response.

MEC network 140 may include one or more MEC devices 145. MEC devices 145 may provide MEC services to UE devices 110. A MEC service may include, for example, a low-latency microservice associated with a particular application, such as, for example, a user authentication microservice, a navigation microservice, an online shopping microservice, a content delivery microservice, a gaming microservice, a virtual and/or augmented reality microservice, a health monitoring microservice, and/or another type of microservice associated with a low latency requirement. As another example, a MEC microservice may include a microservice associated with a virtualized network function (VNF) of core network 150. As yet another example, a MEC microservice may include a cloud computing service, such as cache storage, use of artificial intelligence (AI) accelerators for machine learning computations, image processing, data compression, locally centralized gaming, use of Graphics Processing Units (GPUs) and/or other types of hardware accelerators for processing of graphics information and/or other types of parallel processing, and/or other types of cloud computing services.

Core network 150 may be managed by a provider of cellular wireless communication services and may manage communication sessions of subscribers connecting to core network 150 via RAN 130. For example, core network 150 may establish an Internet Protocol (IP) connection between UE devices 110 and PDN 160. In some implementations, core network 150 may include a 4G core network (e.g., an evolved packet core (EPC) network). Exemplary components of a 4G core network are described below with reference to FIG. 2. In other implementations, core network 150 may include a 5G core network. Exemplary components of a 5G core network are described below with reference to FIG. 3.

The components of core network 150 may be implemented as dedicated hardware components or as virtualized functions implemented on top of a common shared physical infrastructure using Software Defined Networking (SDN). For example, an SDN controller may implement one or more of the components of core network 150 using an adapter implementing a VNF virtual machine, a Cloud Native Function (CNF) container, an event driven serverless architecture interface, and/or another type of SDN architecture. The common shared physical infrastructure may be implemented using one or more devices 400 described below with reference to FIG. 4 in a cloud computing center associated with core network 150. Additionally, or alternatively, some, or all, of the common shared physical infrastructure may be implemented using one or more devices 400 implemented in MEC device 145 in MEC network 140.

Enterprise networks 160-A to 160-Y may each include a private PDN or a public PDN. A particular PDN 160 may be associated with an Access Point Name (APN) and a UE device may request a connection to PDN 160 using the APN. PDN 160 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

Billing system 170 may include one or more computer devices, such as, for example, server devices, configured to receive charges, for an account associated with UE device 110, from core network 150. A charge may be based on particular data flows associated with UE device 110 and parameters associated with the particular data flows. Billing system 170 may generate an accounting or a bill for the account based on the charges received from core network 150.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
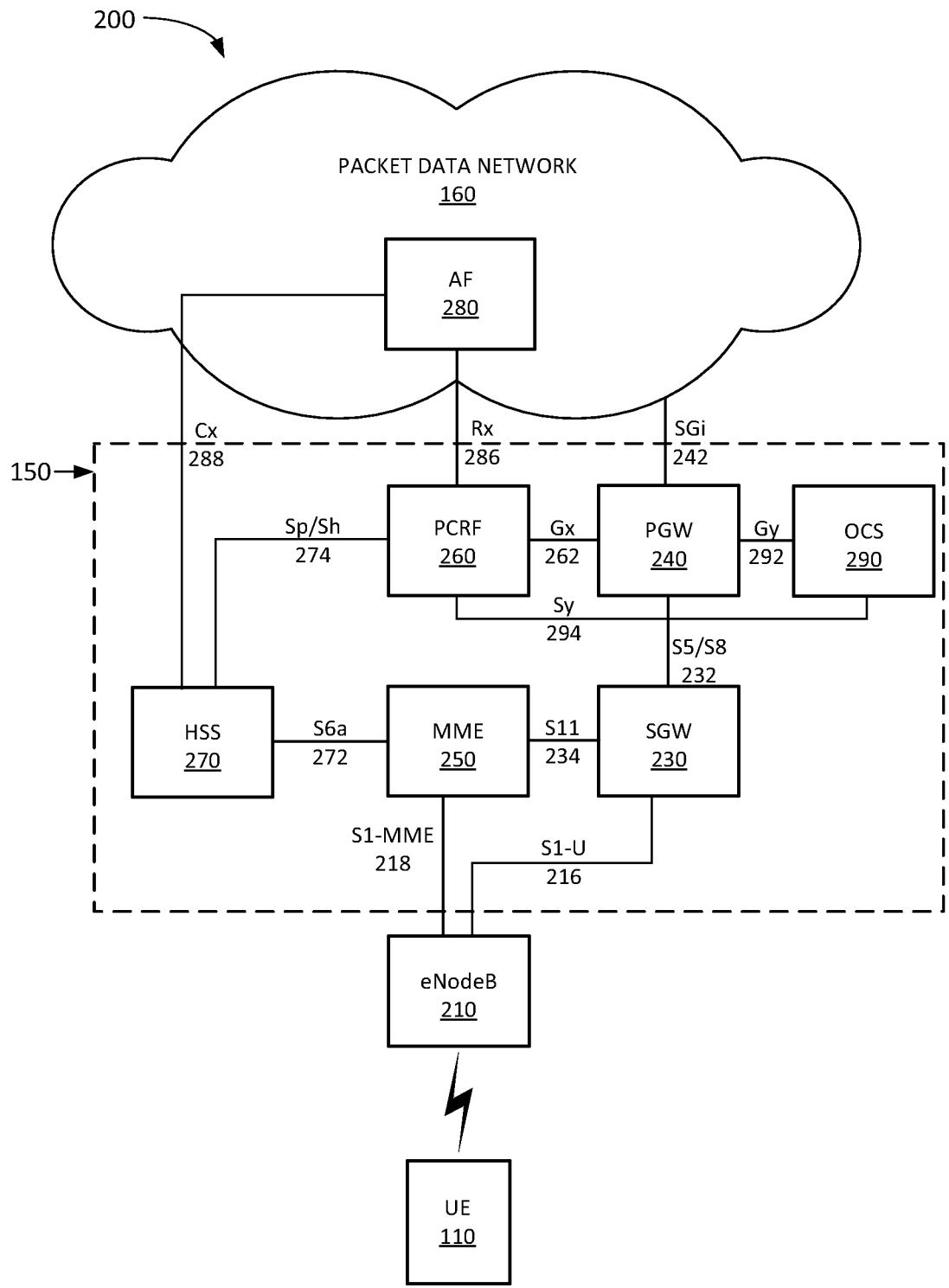
FIG. 2 is a diagram illustrating exemplary components of a Fourth Generation core network of FIG. 1 according to an implementation described herein.

FIG. 2 illustrates a system 200 that includes exemplary components of core network 150 that includes a 4G LTE core network according to an implementation described herein. As shown in FIG. 2, system 200 may include UE device 110, eNodeB 210, core network 150, and PDN 160. eNodeB 210 may correspond to, or be included in, base station 120. eNodeB 210 may communicate with UE device 110 using a 4G LTE air interface referred to as an Evolved Universal Mobile Telecommunications System (UMTS) Terrestrial Radio Access Network (E-UTRA) interface 212.

As shown in FIG. 2, core network 150 may include a Serving Gateway (SGW) 230, a Packet Data Network (PDN) Gateway (PGW) 240, a Mobility Management Entity (MME) 250, a Policy and Charging Rules Function (PCRF) 260, HSS 270, and OCS 290. While FIG. 2 depicts a single eNodeB 210, a single SGW 230, a single PGW 240, a single MME 250, a single PCRF 260, a single HSS 270, and a single OCS 290 for illustration purposes, in practice, system 200 may include multiple eNodeBs 210, multiple SGWs 230, multiple PGWs 240, multiple MMES 250, multiple PCRFs 260, multiple HSSs 270, and/or multiple OCSs 290.

eNodeB 210 may interface with core network 150 via an interface referred to as an S1 interface, which may include both a control plane S1-MME interface 218 and a data plane S1-U interface 216. S1-MME interface 218 may interface with MME 250. S1-MME interface 218 may be implemented, for example, with a protocol stack that includes a Non-Access Stratum (NAS) protocol and/or Stream Control Transmission Protocol (SCTP). An S1-U interface 216 may interface with SGW 230 and may be implemented, for example, using General Packet Radio Service (GPRS) Tunneling Protocol version 2 (GTPv2).

SGW 230 may provide an access point to and from UE device 110, may handle forwarding of data packets for UE device 110, and may act as a local anchor point during handover procedures between different eNodeBs 210. SGW 230 may interface with PGW 240 through an S5/S8 interface 232. S5/S8 interface 232 may be implemented, for example, using GTPv2. PGW 240 may function as a gateway to IP network 201 through an SGi interface 242. A particular UE device 110, while connected to a single SGW 230, may be connected to multiple PGWs 240, one for each data network (e.g., PDN 160) with which UE device 110 communicates. For example, a particular PGW 240 may be associated with a particular APN and UE device 110 may connect to the particular APN by connecting to the PGW 240 associated with the particular APN. Thus, UE device 110 may be connected to one or more APNs at a particular time. PGW 240 may be configured to report, to OCS 290, parameters of a data flow that are used for determining charges for the data flow such as, for example, QoS class, and/or application identifier associated with the data flow. Furthermore, PGW 240 may be configured to measure and report, to OCS 290, performance parameters such as, for example, data throughput, data rate, latency, jitter, etc.

MME 250 may implement control plane processing for core network 150. For example, MME 250 may manage the mobility of UE device 110, implement tracking and paging procedures for UE device 110, activate and deactivate bearers for UE device 110, authenticate a user of UE device 110, and/or interface to non-LTE radio access networks. A bearer may represent a logical channel with particular QoS requirements. MME 250 may also select a particular SGW 230 for a particular UE device 110. A particular MME 250 may interface with other MMEs 250 (not shown in FIG. 2) in core network 150 and may send and/or receive information associated with UE devices 110, which may allow one MME 250 to take over control plane processing for UE devices 110 serviced by another MME 250, if the other MME 250 becomes unavailable. Furthermore, MME 250 may manage non-IP communication with UE device 110 using NAS. MME 250 may page UE device 110 based on mobility category information associated with UE device 110 obtained from HSS 270.

MME 250 may communicate with SGW 230 through an S11 interface 234. S11 interface 234 may be implemented, for example, using GTPv2. S11 interface 234 may be used to create and manage a new session for a particular UE device 110. S11 interface 234 may be activated when MME 250 needs to communicate with SGW 230, such as when the particular UE device 110 attaches to core network 150, when bearers need to be added or modified for an existing session for the particular UE device 110, when a connection to a new PGW 240 needs to be created, or during a handover procedure (e.g., when the particular UE device 110 needs to switch to a different SGW 230).

PCRF 260 may implement policy and charging rules functions, such as establishing QoS requirements, setting allowed bandwidth and/or data throughput limits for particular bearers and/or UE devices 110, determining charges for a particular service for a UE device 110, and/or other types of policy or charging rules. PCRF 260 may communicate with PGW 240 through a Gx interface 262. Gx interface 262 may be implemented, for example, using Diameter protocol. Furthermore, PCRF 260 may obtain an enterprise policy that includes a mapping between applications associated with the enterprise and QoS classes and may provide the enterprise policy to PGW 240.

HSS 270 may store subscription information associated with UE devices 110 and/or information associated with users of UE devices 110. For example, HSS 270 may store subscription profiles that include authentication, access, and/or authorization information. Each subscription profile may include information identifying UE device 110, authentication and/or authorization information for UE device 110, services enabled and/or authorized for UE device 110, device group membership information for UE device 110, and/or other types of information associated with UE device 110. HSS 270 may communicate with MME 250 through an S6a interface 272. S6a interface 272 may be implemented, for example, using a Diameter protocol. HSS 270 may communicate with PCRF device 260 using an Sp/Sh interface 274. AF 280 may provide an enterprise policy to PCRF 260. AF 280 may communicate with PCRF 260 through an Rx interface 286 and may communicate with HSS 250 through a Cx interface 288. Rx interface 286 and Cx interface 288 may be implemented, for example, using Diameter protocol.

OCS 290 may generate a charging record for UE device 110 based on data flow information associated with UE device 110. OCS 290 may receive data flow information from PGW 240 via Gy interface 292. Furthermore, OCS 290 may receive policy information relating to policies applied to data flows associated with UE device 110 from PCRF 260 via Sy interface 294. Gy interface 292 and Sy interface 294 may be implemented, for example, using Diameter protocol. OCS 290 may provide the generated charging records to billing system 170.

Although FIG. 2 shows exemplary components of core network 150, in other implementations, core network 150 may include fewer components, different components, differently arranged components, or additional components than depicted in FIG. 2. Additionally, or alternatively, one or more components of core network 150 may perform functions described as being performed by one or more other components of core network 150.

Figure 3:
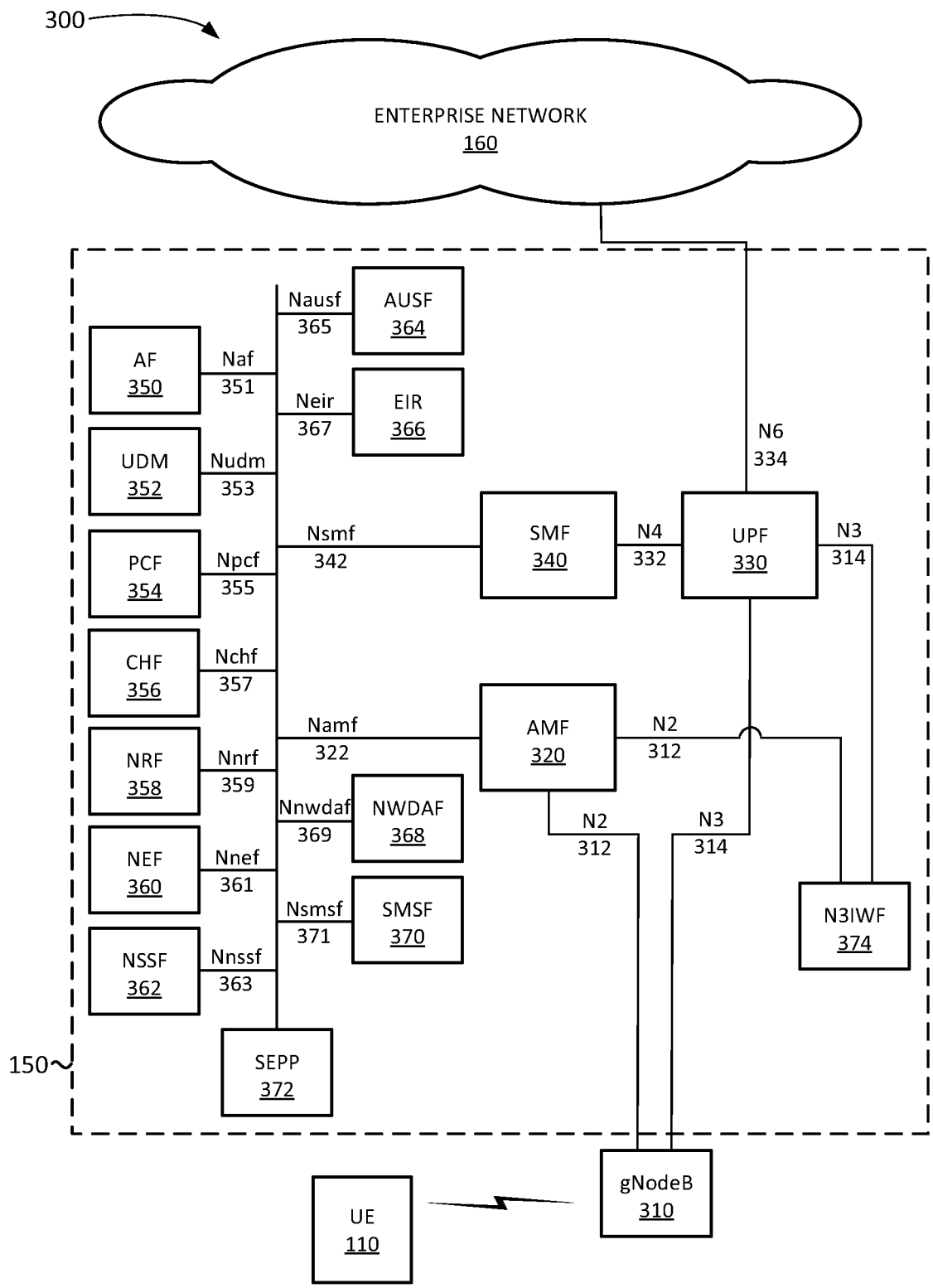
FIG. 3 is a diagram illustrating exemplary components of a Fifth Generation core network of FIG. 1 according to an implementation described herein.

FIG. 3 illustrates a system 300 that includes exemplary components of core network 150 in the context of environment 100 according to an implementation described herein. As shown in FIG. 3, system 300 may include UE device 110, gNodeB 310, core network 150, and PDN 160.

gNodeB 310 (corresponding to base station 120) may include one or more devices (e.g., base stations) and other components and functionality that enable UE device 110 to wirelessly connect to core network 150 using 5G NR Radio Access Technology (RAT). For example, gNodeB 310 may service one or more cells, with each cell being served by a wireless transceiver with an antenna array configured for mm-wave wireless communication. gNodeB 310 may communicate with AMF 320 using an N2 interface 312 and communicate with UPF 330 using an N3 interface 314.

Core network 150 may include an Access and Mobility Function (AMF) 320, a User Plane Function (UPF) 330, a Session Management Function (SMF) 340, an Application Function (AF) 350, a Unified Data Management (UDM) 352, a Policy Control Function (PCF) 354, a Charging Function (CHF) 356, a Network Repository Function (NRF) 358, a Network Exposure Function (NEF) 360, a Network Slice Selection Function (NSSF) 362, an Authentication Server Function (AUSF) 364, a 5G Equipment Identity Register (EIR) 366, a Network Data Analytics Function (NWDAF) 368, a Short Message Service Function (SMSF) 370, a Security Edge Protection Proxy (SEPP) 372, and a Non-3GPP Inter-Working Function (N3IWF) 374.

While FIG. 3 depicts a single AMF 320, UPF 330, SMF 340, AF 350, UDM 352, PCF 354, CHF 356, NRF 358, NEF 360, NSSF 362, AUSF 364, EIR 366, NWDAF 368, SMSF 370, SEPP 372, and N3IWF 374 for illustration purposes, in practice, core network 150 may include multiple AMFs 320, UPFs 330, SMFs 340, AFs 350, UDMs 352, PCFs 354, CHFs 356, NRFs 358, NEFs 360, NSSFs 362, AUSFs 364, EIRs 366, NWDAFs 368, SMSFs 370, SEPPs 372, and/or N3IWFs 374.

AMF 320 may perform registration management, connection management, reachability management, mobility management, lawful intercepts, Short Message Service (SMS) transport between UE device 110 and SMSF 370, session management messages transport between UE device 110 and SMF 340, access authentication and authorization, location services management, functionality to support non-3GPP access networks, and/or other types of management processes. AMF 320 may be accessible by other function nodes via an Namf interface 322.

UPF 330 may maintain an anchor point for intra/inter-RAT mobility, maintain an external Packet Data Unit (PDU) point of interconnect to a particular data network (e.g., PDN 160), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN node (e.g., gNodeB 310), and/or perform other types of user plane processes. UPF 330 may communicate with SMF 340 using an N4 interface 332 and connect to data network 140 using an N6 interface 334. UPF 330 may be configured to report, to CHF 356 via SMF 340, parameters of a data flow that are used for determining charges for the data flow such as, for example, the network slice, QoS class, and/or application identifier associated with the data flow. Furthermore, UPF 330 may be configured to measure and report, to CHF 356 via SMF 340, performance parameters such as, for example, data throughput, data rate, latency, jitter, etc. SMF 340 may perform session establishment, session modification, and/or session release, perform IP address allocation and management, perform Dynamic Host Configuration Protocol (DHCP) functions, perform selection and control of UPF 330, configure traffic steering at UPF 330 to guide the traffic to the correct destinations, terminate interfaces toward PCF 354, perform lawful intercepts, charge data collection, support charging interfaces, control and coordinate of charging data collection, terminate session management parts of NAS messages, perform downlink data notification, manage roaming functionality, and/or perform other types of control plane processes for managing user plane data. SMF 340 may be accessible via an Nsmf interface 342.

AF 350 may provide services associated with a particular application, such as, for example, an application for influencing traffic routing, an application for accessing NEF 360, an application for interacting with a policy framework for policy control, and/or other types of applications. AF 350 may be accessible via an Naf interface 351, also referred to as an NG5 interface.

UDM 352 may maintain subscription information for UE devices 110, manage subscriptions, generate authentication credentials, handle user identification, perform access authorization based on subscription data, perform network function registration management, maintain service and/or session continuity by maintaining assignment of SMF 340 for ongoing sessions, support SMS delivery, support lawful intercept functionality, and/or perform other processes associated with managing user data. UDM 352 may be accessible via a Nudm interface 353.

PCF 354 may support policies to control network behavior, provide policy rules to control plane functions (e.g., to SMF 340), access subscription information relevant to policy decisions, perform policy decisions, and/or perform other types of processes associated with policy enforcement. PCF 354 may be accessible via Npcf interface 355. Furthermore, PCF 354 may obtain an enterprise policy that includes a mapping between applications associated with the enterprise and QoS classes and may provide the enterprise policy to UPF 330 via SMF 340.

CHF 356 may perform charging and/or billing functions for core network 150. For example, CHF 356 may generate a charging record for UE device 110 based on data flow information associated with UE device 110. CHF 356 may be accessible via Nchf interface 357. CHF 356 may receive data flow information from UPF 330 via SMF 340. Furthermore, CHF 356 may receive policy information relating to policies applied to data flows associated with UE device 110 from PCF 354. CHF 356 may provide the generated charging records to billing system 170.

NRF 358 may support a service discovery function and maintain profiles of available network function (NF) instances and their supported services. An NF profile may include an NF instance identifier (ID), an NF type, a Public Land Mobile Network (PLMN) ID associated with the NF, network slice IDs associated with the NF, capacity information for the NF, service authorization information for the NF, supported services associated with the NF, endpoint information for each supported service associated with the NF, and/or other types of NF information. NRF 358 may be accessible via an Nnrf interface 359.

NEF 360 may expose capabilities and events to other NFs, including $3^{rd}$ party NFs, AFs, edge computing NFs, and/or other types of NFs. Furthermore, NEF 360 may secure provisioning of information from external applications to core network 150, translate information between core network 150 and devices/networks external to core network 150, support a Packet Flow Description (PFD) function, and/or perform other types of network exposure functions. NEF 360 may be accessible via Nnef interface 361.

NSSF 362 may select a set of network slice instances to serve a particular UE device 110, determine network slice selection assistance information (NSSAI), determine a particular AMF 320 to serve a particular UE device 110, and/or perform other types of processing associated with network slice selection or management. NSSF 362 may be accessible via Nnssf interface 363.

AUSF 364 may perform authentication. For example, AUSF 364 may implement an Extensible Authentication Protocol (EAP) authentication server and may store authentication keys for UE devices 110. AUSF 364 may be accessible via Nausf interface 365. EIR 366 may authenticate a particular UE device 110 based on UE device identity, such as a Permanent Equipment Identifier (PEI). For example, EIR 366 may check to see if a PEI has been blacklisted. EIR 366 may be accessible via Neir interface 367.

NWDAF 368 may collect analytics information associated with radio access network 120 and/or core network 150. For example, NWDAF 368 may collect accessibility KPIs (e.g., an RRC setup success rate, a RAB success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of wireless network KPIs.

SMSF 370 may perform SMS services for UE devices 110. SMSF 370 may be accessible via Nsmsf interface 371. SEPP 372 may implement application layer security for all layer information exchanged between two NFs across two different PLMNs. N3IWF 374 may interconnect to a non-3GPP access device, such as, for example, a WiFi Access Point. N3IWF 374 may facilitate handovers for UE device 110 between radio access network 120 and the non-3GPP access device. N3IWF 374 maybe accessible via Nn3iwf interface 375.

Although FIG. 3 shows exemplary components of core network 150, in other implementations, core network 150 may include fewer components, different components, differently arranged components, or additional components than depicted in FIG. 3. Additionally, or alternatively, one or more components of core network 150 may perform functions described as being performed by one or more other components of core network 150. For example, core network 150 may include additional function nodes not shown in FIG. 3, such as a Unified Data Repository (UDR), an Unstructured Data Storage Network Function (UDSF), a Location Management Function (LMF), a Lawful Intercept Function (LIF), a Binding Session Function (BSF), and/or other types of functions. Furthermore, while particular interfaces have been described with respect to particular function nodes in FIG. 3, additionally, or alternatively, core network 150 may include a reference point architecture that includes point-to-point interfaces between particular function nodes.

Figure 4:
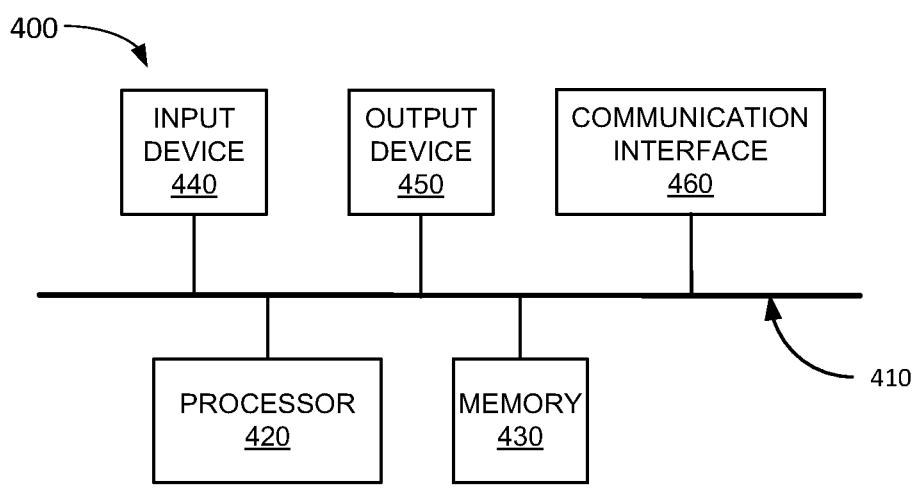
FIG. 4 is a diagram illustrating exemplary components of a device that may be included in a component of FIG. 1, FIG. 2, or FIG. 3 according to an implementation described herein.

FIG. 4 illustrates example components of a device 400 according to an implementation described herein. UE device 110, MEC device 145, eNodeB 210, SGW 230, PGW 240, MME 250, PCRF device 260, HSS 270, OCS 290, CSCF 280, gNodeB 310, AMF 320, UPF 330, SMF 340, AF 350, UDM 352, PCF 354, CHF 356, NRF 358, NEF 360, NSSF 362, AUSF 364, EIR 366, NWDAF 368, SMSF 370, SEPP 372, N3IWF 374, and/or other components of core network 150, may each include one or more devices 400. As shown in FIG. 4, device 400 may include a bus 410, a processor 420, a memory 430, an input device 440, an output device 450, and a communication interface 460.

Bus 410 may include a path that permits communication among the components of device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 440 may allow an operator to input information into device 400. Input device 440 may include, for example, a keyboard, a mouse, a pen, a microphone, a remote control, an audio capture device, an image and/or video capture device, a touch-screen display, and/or another type of input device. In some embodiments, device 400 may be managed remotely and may not include input device 440. In other words, device 400 may be "headless" and may not include a keyboard, for example.

Output device 450 may output information to an operator of device 400. Output device 450 may include a display, a printer, a speaker, and/or another type of output device. For example, device 400 may include a display, which may include a liquid-crystal display (LCD) for displaying content to the customer. In some embodiments, device 400 may be managed remotely and may not include output device 450. In other words, device 400 may be "headless" and may not include a display, for example.

Communication interface 460 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to radio frequency (RF) signals and/or a receiver that converts RF signals to baseband signals. Communication interface 460 may be coupled to one or more antennas/antenna arrays for transmitting and receiving RF signals.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 400 may perform certain operations relating to granular charging in mobile wireless networks. Device 400 may perform these operations in response to processor 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, additional components, or differently arranged components than depicted in FIG. 4. Additionally, or alternatively, one or more components of device 400 may perform one or more tasks described as being performed by one or more other components of device 400.

Figure 5:
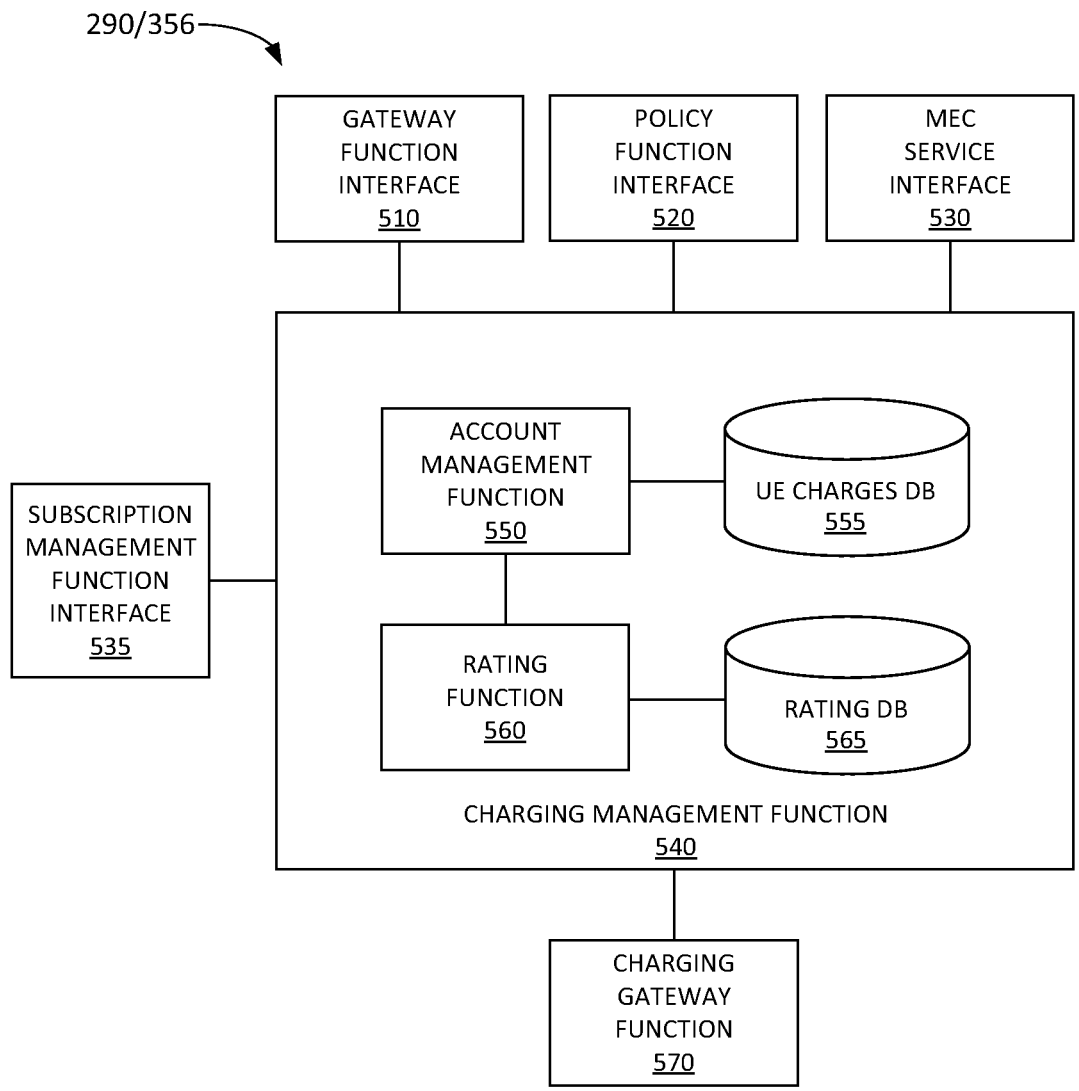
FIG. 5 is a diagram illustrating exemplary components of a charging function device according to an implementation described herein.

FIG. 5 is a diagram illustrating exemplary components of a charging function device corresponding to OCS 290 or CHF 356. The components of OCS 290 or CHF 356 may be implemented, for example, via processor 420 executing instructions from memory 430. Alternatively, some or all of the components of OCS 290 or CHF 356 may be implemented via hard-wired circuitry.

As shown in FIG. 5, OCS 290 or CHF 356 may include a gateway function interface 510, a policy function interface 520, a MEC service interface 530, a charging management function 540, a subscription management function interface 535, and a charging gateway function 570.

Gateway function interface 510 may be configured to interface with a gateway function, such as, for example, PGW 240 via Gy interface 292, or UPF 330 via SMF 340 using Nsmf interface 342. Gateway function interface 510 may receive data flow information relating to data flows associated with UE device 110 from the gateway function. Policy function interface 520 may be configured to interface with a policy function, such as, for example, PCRF 260 via Sy interface 294, or PCF 354 via Npcf interface 355. Policy function interface 520 may receive policy information relating to policies applied to data flows associated with UE device 110 from the policy function. MEC service interface 530 may be configured to interface with MEC network 140 and receive information relating to MEC services consumed by UE device 110 via MEC device 145.

Subscription management function interface 535 may be configured to interface with a subscription management function, such as, for example, HSS 270 or UDM 352. Subscription management function interface 535 may receive subscription information relating to UE device 110 from the subscription management function. The subscription information may include information identifying an account associated with the subscription, information identifying UE device 110 associated with the subscription, information identifying SLAs associated with the subscription, information identifying rates for particular types of data flows associated with the subscription, and/or other types of subscription information.

Charging management function 540 may determine granular charges for UE device 110 based on data flows associated with UE device 110. Charging management function 540 may include an account management function 550, a UE charges database (DB) 555, a rating function 560, and a rating DB 565.

Account management function 550 may manage an account for a subscription associated with UE device 110. For example, account management function 550 may collect data flow information relating to UE device 110, determine charges for UE device 110 based on the collected information and based on charging rates obtained from rating function 560, and generate a charging record for UE device 110 based on the determined charges and store the generated charging record in UE charges DB 555. Exemplary information that may be stored in UE charges DB 555 is described below with reference to FIG. 6.

Rating function 560 may determine charge rates for particular data flows associated with UE device 110 based on charge rates stored in rating DB 565. For example, rating DB 565 may store rate information for particular QoS classes, network slices, applications, MEC services, throughput guarantee policies, latency guarantee policies, jitter guarantee policies, security policies, and/or other types of charging rates. Charging gateway function 570 may be configured to communicate with billing system 170. For example, charging gateway function 570 may send a charging record generated by charging management function 540 to billing system 170.

Rating function 560 may be configured to dynamically adjust the rates in rating DB 565. As an example, rating function 560 may implement surge pricing. If the number of UE devices 110 using a particular (e.g., low latency, high security, etc.) network slice, QoS class, application, and/or MEC service increases above a use threshold, rating function 560 may increase a charge associated with the particular network slice, QoS class, application, and/or MEC service. As another example, rating function 560 may implement tiered pricing. For example, rating function 560 may implement a first charge amount for activating the use of a network slice, and may implement a second charge amount for using the network slice if the use of the network slice exceeds a usage threshold (e.g., the amount of data sent and/or received via the network slice within a specified time period). As yet another example, launching of an application may trigger usage of a particular network slice. However, if the particular network slice is not available in a location, a default network slice may be used for the application instead and a different charge amount may be applied to use of the application.

Although FIG. 5 shows exemplary components of OCS 290 or CHF 356, in other implementations, OCS 290 or CHF 356 may include fewer components, different components, differently arranged components, or additional components than depicted in FIG. 5. Additionally, or alternatively, one or more components of OCS 290 or CHF 356 may perform functions described as being performed by one or more other components of OCS 290 or CHF 356.

Figure 6:
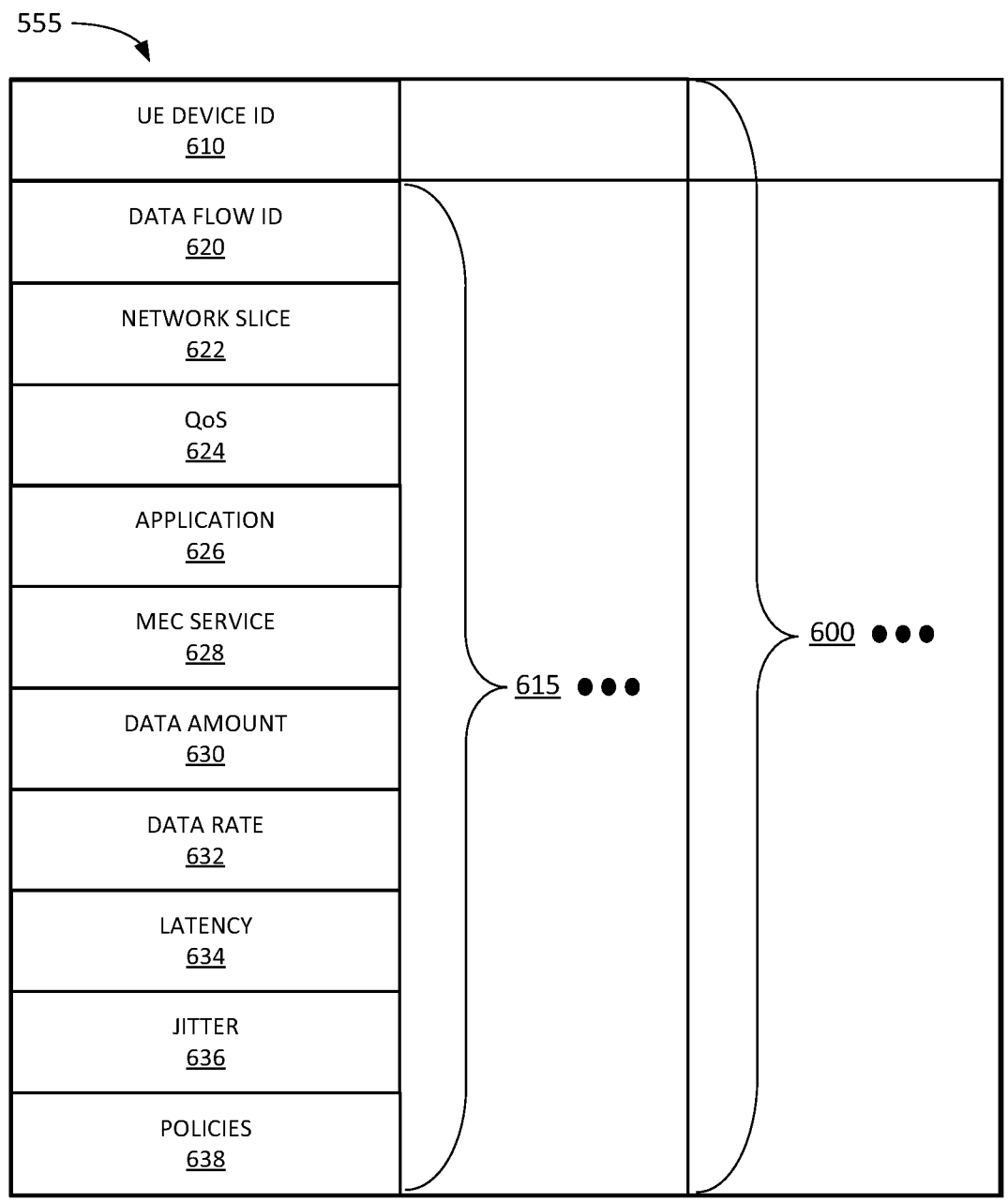
FIG. 6 is a diagram illustrating exemplary components of the user equipment charges database of FIG. 5.

FIG. 6 is a diagram illustrating exemplary information stored in UE charges DB 555. As shown in FIG. 6, UE charges DB 555 may include one or more UE charging records 600. Each UE charging record 600 may store information relating to charges associated with a particular UE device 110. UE charges record 600 may include a UE device identifier (ID) field 610 and one or more data flow charges fields 615.

UE device ID field 610 may store information identifying a particular UE device 110 and/or a subscription associated with the particular UE device 110. For example, UE device ID field 610 may store a customer account number, an International Mobile Equipment Identity (IMEI), a Mobile Directory Number (MDN), an International Mobile Subscriber Identity (IMSI), a Mobile Station International Subscriber Directory Number (MSISDN), an IP address, a Media Access Control (MAC) address, and/or another type of identifier associated with UE device 110.

Each data flow charge field 615 may include a charge for a particular data flow associated with the particular UE device 110. Data flow charge field 615 may include a data flow ID field 620, a network slice field 622, a QoS field 624, an application field 626, a MEC service field 628, a data amount field 630, a data rate field 632, a latency field 634, a jitter field 636, and a policies field 638.

Data flow ID field 620 may store an ID associated with a particular data flow. Network slice field 622 may store information identifying a network slice associated with the particular data flow, such as, for example, a Network Slice Selection Assistance Information (NSSAI) value, a Slice/Service Type (SST) value, a Slice Differentiation (SD) value, and/or another type network slice identification value. Furthermore, network slice field 622 may store a charge amount for using the network slice. As an example, available network slices may be classified into different classes (e.g., low, medium, high cost) and each network slice class may be associated with a different charge amount.

QoS field 624 may store information identifying a QoS class associated with the particular data flow, such as, for example, a QoS Class Identifier (QCI), a 5G QCI (5QI), a Differentiated Services Code Point (DSCP) value, a IEEE 802.1p CoS (dot1p) identifier, and/or another type of QoS classifier. Furthermore, QoS field 624 may store a charge amount associated with using the QoS class. Application field 626 may store information identifying an application associated with the particular data flow. Furthermore, application field 626 may store a charge amount associated with using the application. MEC service field 628 may store information identifying a MEC service associated with the particular data flow. Furthermore, MEC service field 628 may store a charge amount associated with using the MEC service.

Data amount field 630 may store information identifying a data amount (e.g., in bytes, etc.) that was consumed (e.g., sent and/or received) by UE device 10 via the data flow connection. Furthermore, data amount field 630 may store a charge amount associated with the consumed data amount and/or an indication of how much the consumed data amount contributes to a data consumption spending limit for UE device 110.

Data rate field 632 may store information identifying a data rate (e.g., bitrate, etc.) associated with the data flow. Furthermore, data rate field 632 may store a charge amount associated with the identified data rate. Latency field 634 may store information identifying a latency associated with the data flow. Furthermore, latency field 634 may store a charge amount associated with the identified latency. As an example, a first charge amount may be applied to a consumed latency of less than about 10 milliseconds (ms), a second charge amount may be applied to a consumed latency between about 10 ms and 25 ms, and a third charge amount may be applied to a consumed latency greater than about 25 ms. Jitter field 636 may store information identifying a jitter (e.g., a packet delay variation, etc.) associated with the data flow. Furthermore, jitter field 636 may store a charge amount associated with the identified latency. As an example, a charge amount may be applied for a guaranteed ultra-low jitter for cloud gaming applications.

Policies field 638 may store information identifying one or more policies that were applied to the data flow. As an example, policies field 638 may identify a spending limit policy, such as, for example, a total maximum throughput policy, a total maximum data consumption policy, a policy enforcing a maximum throughput or data amount within a time period, a policy enforcing a maximum throughput or data amount for a particular QoS class, and/or another type of spending limit policy. As another example, policies field 638 may identify a service level assurance policy, such as, for example, a throughput guarantee policy, a latency guarantee policy, a jitter guarantee policy, and/or another type of guarantee policy. As yet another example, policies field 638 may identify a security policy, such as, for example, a firewall policy, an encryption policy, a threshold detection policy, a policy to flag anomalous behavior, a malware detection policy, and/or another type of security policy.

Furthermore, policies field 638 may store a charge (or a discount) associated with the applied policy. As an example, a charge associated with an applied security policy may be included in policies field 638. As another example, if a spending limit has been reached and a throughput limiting policy has been applied to the data flow, no charges may be applied or other charges associated with the data flow may be eliminated or reduced.

Although FIG. 6 shows exemplary components of UE charges DB 555, in other implementations, UE charges DB 555 may include fewer components, different components, additional components, or differently arranged components than depicted in FIG. 6.

Figure 7:
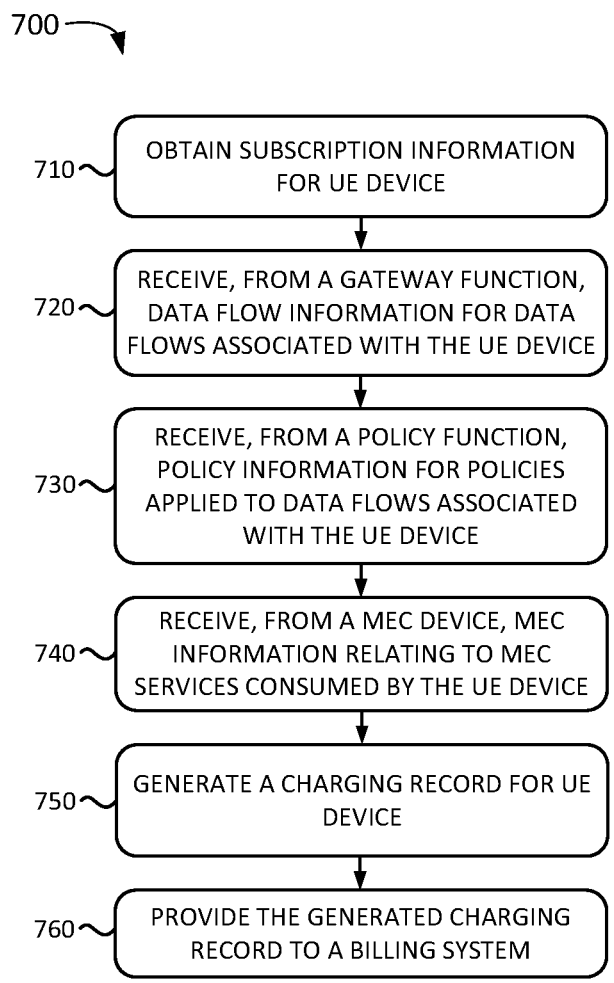
FIG. 7 illustrates a flowchart for granular charging in a mobile wireless network according to an implementation described herein.

FIG. 7 illustrates a flowchart of a process 700 for granular charging in a mobile wireless network according to an implementation described herein. In some implementations, process 700 of FIG. 7 may be performed by OCS 290 or CHF 356. In other implementations, some or all of process 700 may be performed by another device or a group of devices separate from OCS 290 or CHF 356.

As shown in FIG. 7, process 700 may include obtaining subscription information for a UE device in a wireless communication network (block 710). For example, OCS 290 or CHF 356 may receive subscription information from a subscription management device, such as HSS 270 or UDM 352, respectively. The subscription information may include information identifying an account associated with the subscription, information identifying UE device 110 associated with the subscription, information identifying SLAs associated with the subscription, information identifying rates for particular types of data flows associated with the subscription, and/or other types of subscription information.

Process 700 may further include receiving, from a gateway function, data flow information for data flows associated with the UE device (block 720). For example, OCS 290 or CHF 356 may receive, from PGW 240 or UPF 330 (via SMF 340), respectively, a report that includes data flow information relating to a data flow associated with UE device 10. The data flow information may include a network slice ID associated with the data flow, a QoS class associated with the data flow, an application ID associated with the data flow, and/or usage statistics associated with the data flow. The usage statistics may include, for example, a data amount sent or received via the data flow, a throughput or bitrate associated with the data flow, a latency associated with the data flow, a jitter associated with the data flow, and/or other types of usage statistics associated with the data flow.

Process 700 may further include receiving, from a policy function, policy information for policies applied to data flows associated with the UE device (block 730). For example, OCS 290 or CHF 356 may receive, from PCRF 260 or PCF 354, respectively, a report that includes policy information identifying policies applied to the data flow. The policy information may include, for example, a spending limit policy, a service level assurance policy, a security policy, and/or another type of policy applied to the data flow.

Process 700 may further include receiving, from a MEC device, MEC information relating to MEC services consumed by the UE device (block 740). For example, OCS 290 or CHF 356 may receive, from MEC device 145, a report that includes MEC information associated with the data flow. As an example, the MEC information may identify a MEC service used by UE device 110, such as, for example, a microservice associated with a particular application, a cloud computing service, a data processing service, and/or another type of MEC service. As another example, the MEC information may identify MEC resources consumed by UE device 110, such as processor, memory, and/or bandwidth resources consumed by UE device 110.

Process 700 may further include generating a charging record for the UE device that includes charges based the received data flow information, policy information and/or MEC information (block 750). For example, OCS 290 or CHF 356 may determine charges for the data flow based on one or more parameters associated with the data flow. The parameters may be based on the received data flow, policy, and/or MEC information. For each aspect of the data flow, rating function 560 may access rating DB 565 to determine whether a specific charge is assigned to the aspect of the data flow. For example, rating function 560 may check rating DB 565 to determine whether to generate a charge for use of a particular network slice, QoS class, application, MEC services, etc. Furthermore, rating function 560 my check rating DB 565 to determine whether to generate a charge for a particular applied policy or a particular service level reached by the data flow, such as a throughput, data rate, latency, and/or jitter. In some implementations, rating function 560 may store the individually determined charges in the generated charging record for UE device 110. In other implementations, rating function 560 may combine the individually determined charges into a combined charge by adding the individual charges, by performing a weighted sum, by applying a particular discount or rate reduction, and/or by otherwise combining the individually determined charges.

Process 700 may further include providing the generated charging record to a billing system (block 760). For example, OCS 290 or CHF 356 may send the generated charging record for UE device 110 to billing system 170. Billing system 170 may add the charging record to a bill for a subscription associated with UE device 110.

Figure 8:
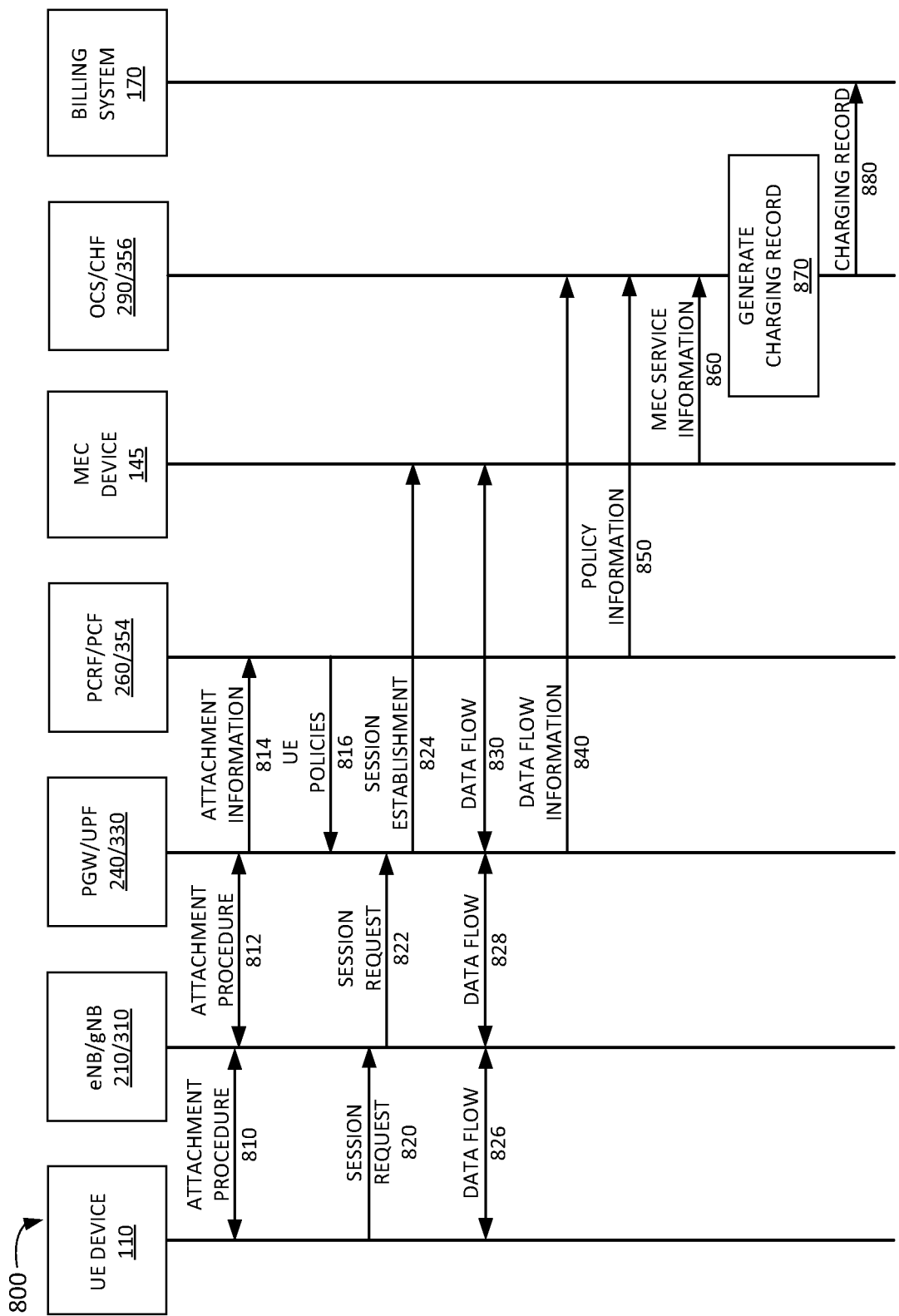
FIG. 8 illustrates an exemplary signal flow according to an implementation described herein.

FIG. 8 illustrates an exemplary signal flow 800 according to an implementation described herein. As shown in FIG. 8, signal flow 800 may include UE device 110 performing an attachment procedure to establish a connection with either PGW 240 or UPF 330. The attachment procedure may include establishing a wireless connection with eNodeB 210 or with gNodeB 310 (signal 810) and then establishing IP connectivity with a gateway device in core network 150 (signal 812), such as, for example, PGW 240 (in a 4G core network 150) or UPF 330 (in a 5G core network 150). During the attachment procedure, PGW 240 (in a 4G core network 130) or SMF 340 controlling UPF 330 (in a 5G core network 130) may send attachment information (signal 814) to a policy device, for example, PCRF 260 (in a 4G core network 130) or PCF 354 (in a 5G core network 130) and the policy device may provide policies for data flows associated with UE device 110 to the gateway device (signal 816).

At a later time, UE device 110 may send a session request to the gateway device via the base station to establish a data flow session (signals 826 and 828). For example, assume UE device 110 has requested to access a MEC service in MEC device 145. The gateway device may establish a session with MEC device 145 (signal 824) and a data flow may be established between UE device 110 and MEC device 145 via the base station and gateway device (signals 826, 828, and 830).

When the data flow session ends, the gateway device may report data flow information associated with the data flow to the charging function device (signal 840), such as, for example, OCS 290 (in a 4G core network 150) or CHF 356 (in a 5G core network 150). Furthermore, the policy device may report, to the charging function device, policies information relating to policies that were applied to the data flow (signal 850). Additionally, MEC device 145 may report, to the charging function device, MEC information relating to MEC services consumed by UE device 110 at MEC device 145 (signal 860). The charging function device may generate a charging record for UE device 10 based on the received data flow, policies, and MEC information (block 870) and provide the generated charging record to billing system 170 (signal 880).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 7, and a series of signals have been described with respect to FIG. 8, the order of the blocks, and/or signals, may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
obtaining, by a charging function device, subscription information associated with a user equipment (UE) device, wherein the charging function device is configured to generate charging records for UE devices in a core network associated with a Radio Access Network (RAN) providing wireless access for the UE devices;
receiving, by the charging function device and from a gateway device, data flow information relating to data flows associated with the UE device;
receiving, by the charging function device and from a policy device, policy information relating to policies applied to the data flows associated with the UE device;
generating, by the charging function device, a charging record for the UE device based on the received data flow information and the received policy information, wherein the charging record identifies at least one account charge based on at least one of a latency or a data rate for a particular data flow associated with the UE device; and providing, by the charging function device, the generated charging record to an account system.

2. The method of claim 1, wherein the device includes a Charging Function (CHF), wherein the policy device includes a Policy Control Function (PCF), and wherein the gateway device includes a User Plane Function (UPF).

3. The method of claim 1, wherein the policy device includes a Policy and Charging Rules Function (PCRF) and wherein the gateway device includes a Packet Data Network Gateway (PGW).

4. The method of claim 1, wherein the data flow information includes a Quality of Service (QoS) class for a data flow associated with the UE device, and wherein generating the record for the UE device further includes:

generating a charge for the record based on the QoS class for the data flow associated with the UE device.

5. The method of claim 1, wherein the data flow information includes a network slice identifier for a data flow associated with the UE device, and wherein generating the record for the UE device further includes:

generating a charge for the record based on the network slice identifier for the data flow associated with the UE device.

6. The method of claim 1, wherein the data flow information includes an application identifier for a data flow associated with the UE device, and wherein generating the record for the UE device further includes:

generating a charge for the record based on the application identifier for the data flow associated with the UE device.

7. The method of claim 1, wherein the data flow information includes at least two of a Quality of Service (QoS) class for a data flow associated with the UE device, a network slice identifier for the data flow associated with the UE device, an application identifier for the data flow associated with the UE device, a number of bytes transmitted using the data flow associated with the UE device, a bit rate for the data flow associated with the UE device, a latency for the data flow associated with the UE device, or a packet delay variation associated with the UE device.

8. The method of claim 1, wherein the policy information includes at least one of a service level assurance policy applied to a data flow associated with the UE device, a limit policy applied to the data flow associated with the UE device, or a security policy applied to the data flow associated with the UE device.

9. The method of claim 1, further comprising:

receiving, from a Multi-Access Edge Computing (MEC) device, MEC information relating to a MEC service consumed by the UE device;

generating another record for the UE device based on the received MEC information, wherein the other record includes at least one charge based on the MEC service consumed by the UE device; and providing the generated other record to the account system.

10. The method of claim 9, wherein the MEC information includes at least one of information identifying a microservice used by the UE device or computational resources, associated with the MEC device, used by the UE device.

11. A device comprising:

a processor configured to:

implement a charging function device configured to generate charging records for user equipment (UE) devices in a core network associated with a Radio Access Network (RAN) providing wireless access for the UE devices;

obtain, by the charging function device, subscription information associated with UE device connected to the RAN;

receive, by the charging function device and from a gateway device, data flow information relating to data flows associated with the UE device;

receive, by the charging function device and from a policy device, policy information relating to policies applied to the data flows associated with the UE device;

generate, by the charging function device, a charging record for the UE device based on the received data flow information and the received policy information, wherein the charging record identifies at least one charge based on at least one of a latency or a data rate for a particular data flow associated with the UE device; and provide, by the charging function device, the generated charging record to a billing system.

12. The device of claim 11, wherein the device includes a Charging Function (CHF), wherein the policy device includes a Policy Control Function (PCF), and wherein the gateway device includes a User Plane Function (UPF).

13. The device of claim 11, wherein the policy device includes a Policy and Charging Rules Function (PCRF) and wherein the gateway device includes a Packet Data Network Gateway (PGW).

14. The device of claim 11, wherein the data flow information includes a Quality of Service (QoS) class for a data flow associated with the UE device, and wherein, when generating the charging record for the UE device, the processor is further configured to:

generate a charge for the charging record based on the QoS class for the data flow associated with the UE device.

15. The device of claim 11, wherein the data flow information includes a network slice identifier for a data flow associated with the UE device, and wherein, when generating the charging record for the UE device, the processor is further configured to:

generate a charge for the charging record based on the network slice identifier for the data flow associated with the UE device.

16. The device of claim 11, wherein the data flow information includes an application identifier for a data flow associated with the UE device, and wherein, when generating the charging record for the UE device, the processor is further configured to:

generate a charge for the charging record based on the application identifier for the data flow associated with the UE device.

17. The device of claim 11, wherein the data flow information includes at least two of a Quality of Service (QoS) class for a data flow associated with the UE device, a network slice identifier for the data flow associated with the UE device, an application identifier for the data flow associated with the UE device, a number of bytes transmitted using the data flow associated with the UE device, a bitrate for the data flow associated with the UE device, a latency for the data flow associated with the UE device, or a packet delay variation associated with the UE device.

18. The device of claim 11, wherein the policy information includes at least one of a service level assurance policy applied to a data flow associated with the UE device, a spending limit policy applied to the data flow associated with the UE device, or a security policy applied to the data flow associated with the UE device.

19. The device of claim 11, wherein the processor is further configured to:
receive, from a Multi-Access Edge Computing (MEC) device, MEC information relating to a MEC service consumed by the UE device, wherein the MEC information includes at least one of information identifying a microservice used by the UE device or computational resources, associated with the MEC device, used by the UE device;
generate another charging record for the UE device based on the received MEC information, wherein the other charging record includes at least one charge based on the MEC service consumed by the UE device; and
provide the generated other charging record to the billing system.

20. A system comprising:
a gateway device configured to:
process at least one data flow for a user equipment (UE) device connected to a Radio Access Network (RAN); and a charging function device configured to:
generate charging records for user equipment (UE) devices in a core network associated with the RAN, wherein the RAN provides wireless access for the UE devices;
obtain subscription information associated with the UE device;
receive, from the gateway device, data flow information relating to data flows associated with the UE device;
receive, from a policy device, policy information relating to policies applied to the data flows associated with the UE device;
generate a charging record for the UE device based on the received data flow information and the received policy information, wherein the charging record identifies at least one charge based on at least one of a latency or a data rate for a particular data flow associated with the UE device; and
provide the generated charging record to a billing system.

* * * * *